July 15, 1958 — R. W. BONNETTE ET AL — 2,843,022
MOVABLE JAW GUN ENCLOSURE
Filed May 11, 1955 — 2 Sheets-Sheet 1

Inventors:
Robert B. Tassie,
Rene W. Bonnette,
by *Charles H. Mott*
Their Attorney.

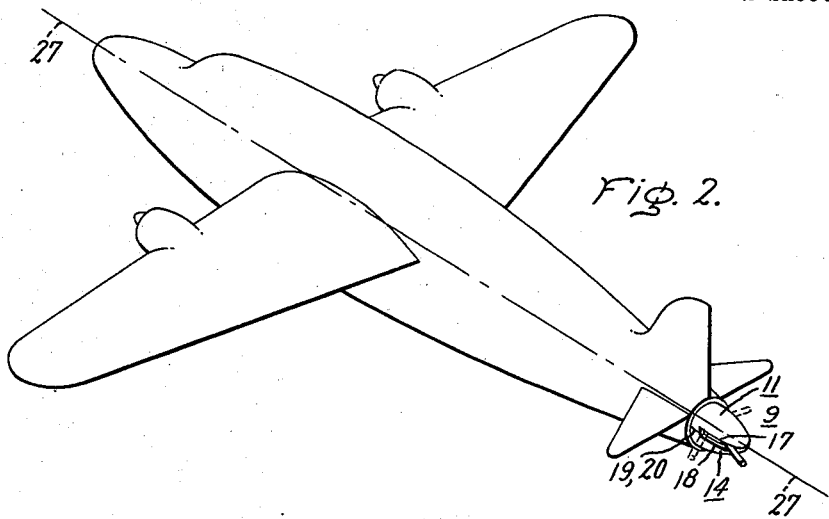
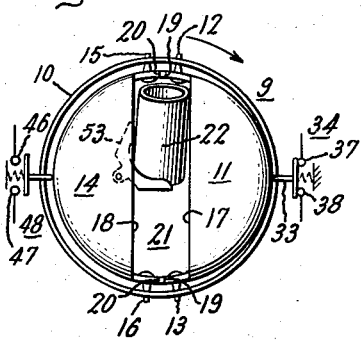
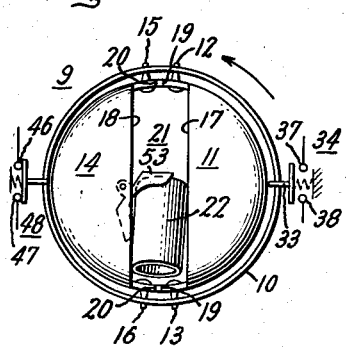
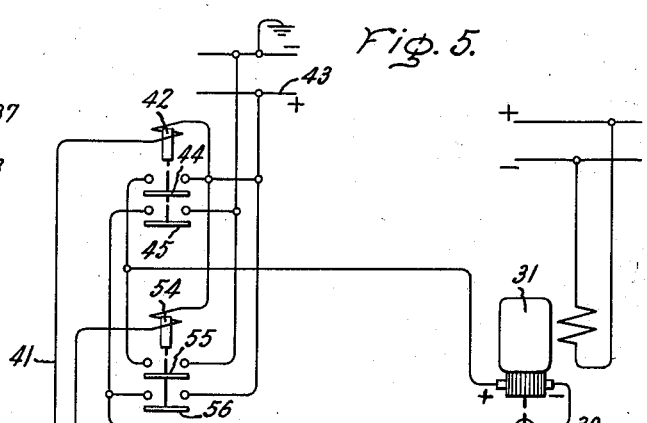
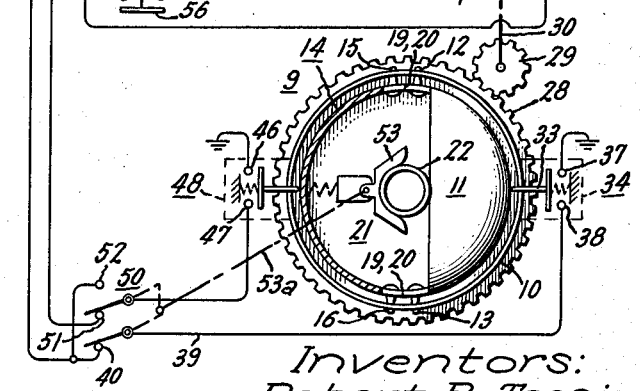
Inventors:
Robert B. Tassie,
Rene W. Bonnette,
by Their Attorney.

2,843,022
MOVABLE JAW GUN ENCLOSURE

Rene W. Bonnette and Robert B. Tassie, Burlington, Vt., assignors to General Electric Company, a corporation of New York Application May 11, 1955, Serial No. 507,598

12 Claims. (Cl. 89—37.5)

This invention generally relates to movable housings for guns or the like, and more particularly to improvements in movable turret housings for aircraft tail artillery.

In the past, gun turret housings for the tail portion of an aircraft have been hemispherically or "ball" shaped having a slotted opening permitting the training of the gun up and down in elevation, and provided with means for swiveling the turret housing and gun together from side to side to enable positioning of the gun in azimuth. However, with higher speeds of aircraft, these ball-type turret housings provide considerable wind resistance and drag upon the plane, and there exists a need for a more streamlined housing to reduce this wind resistance.

However, merely streamlining the outer form of the ball-type housing and operating the turret in the same manner is not a satisfactory solution to this problem, since the wind resistance provided by the housing must be the same for all positions of the gun. Otherwise stated, the turning moment of the wind force against the housing must be symmetrical or balanced for all positions of the gun, otherwise the housing surfaces act as a rudder, elevator, or the like, and produce an unbalanced torque on the aircraft, tending to turn the aircraft as the turret and gun are positioned in azimuth. For this reason, a ball or hemispherically-shaped turret has heretofore been the only known type that may be movable in azimuth and yet present the same wind force for each position of the gun.

In accordance with the present invention, a new and improved turret housing is provided that is both streamlined and yet symmetrically balanced for all positions of the gun in either azimuth or elevation, thereby reducing the wind resistance and drag on the aircraft formerly provided by the ball-type housing while at the same time not providing the turning movement heretofore encountered with other types of housings. Basically, in accordance with this invention, this streamlined housing is provided with a slotted opening for enabling free movement of the gun through this opening, and is also provided with means for freely rotating this slotted opening to any position between and including horizontal or vertical position. By rotating this slotted opening rather than moving the housing from side to side, the gun may be rapidly trained to any desired position in azimuth and elevation without varying the symmetry of the wind forces acting against the housing surfaces. Thus, the surfaces of this housing remain symmetrically disposed with respect to the longitudinal axis of the aircraft for all desired positions of the gun, whereby the wind resistance remains balanced and the same at all times and lower than that provided by the ball type turret housing.

In accordance with a second feature of this invention, the gun itself is trained in both azimuth and elevation, rather than having the turret housing being swiveled in azimuth and the gun trained in elevation alone as heretofore employed with the ball-type or other type turrets. The rotating mechanism may, therefore, be considered as a follow-up device responsive to the position of the gun, and rotating the housing to its proper position to enable the gun to be directed or trained to its desired firing position in azimuth or elevation in the shortest possible time.

It is accordingly one object of the present invention to provide a new and improved turret housing for aircraft tail artillery.

A further object of this invention is to provide a tail turret housing for aircraft providing less wind resistance and drag than prior known devices.

A still further object of the present invention is to provide a tail turret housing for aircraft having the same wind resistance and drag upon the aircraft for all desired training positions of the gun.

Other objects and many attendant advantages of this invention will be more fully comprehended by those skilled in the art upon a detailed consideration of the following specification taken with the accompanying drawings, wherein:

Fig. 2 is a perspective view depicting the apparatus of Fig. 1 in an aircraft;

Figs. 3 and 4 are rear elevations depicting the gun in two different positions; and Fig. 5 is an electrical schematic drawing illustrating one preferred electrical position control system for driving the apparatus of Fig. 1.

Figure 1:
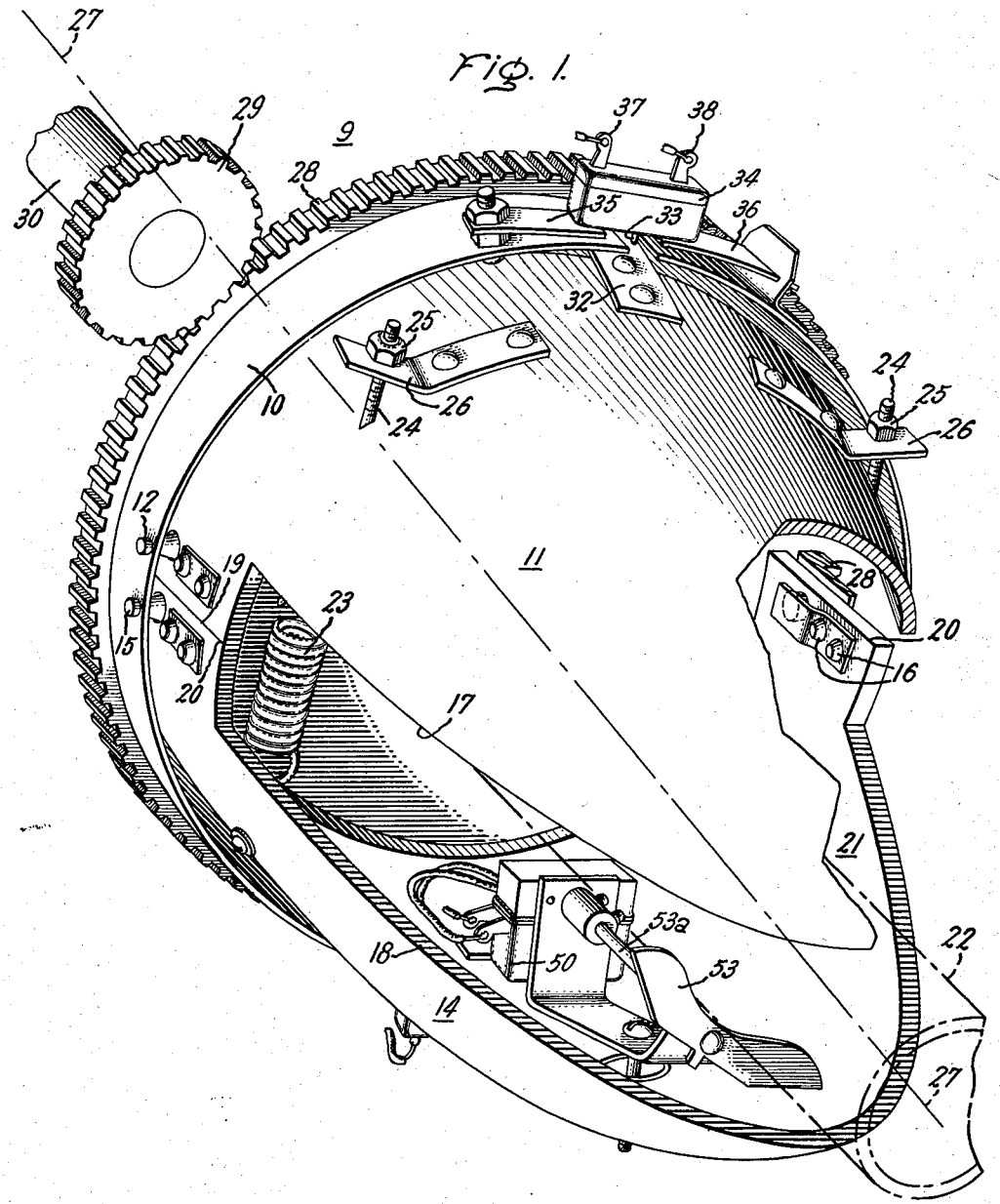
Fig. 1 is a perspective view of one apparatus incorporating the present invention, partially in section.

Referring now to Fig. 1 for detailed consideration of one preferred embodiment of the present invention, the overall aircraft turret housing generally designated 9 is comprised of an endless arcuate frame member 10, that may be circular as shown, pivotally supporting a streamlined upper jaw member 11 about suitable junction points 12 and 13 (see also Fig. 3) and pivotally supporting a second streamlined lower jaw member 14 about pivots 15 and 16 (see also Fig. 3). Upper and lower jaw members 11 and 14 are each provided with a substantially L-shaped cutout portion extending substantially completely about and around the forward and side portions thereof (as best viewed in Fig. 1), whereby when the jaws are in closed position, as best shown in Figs. 1 and 2, the rear edges 19 and 20 thereof abut and the cutaway edges 17 and 18 form a wide angle slotted mouth, generally designated 21, permitting the positioning of a gun 22 housed therein over a substantially 180-degree angle through this slotted opening (Fig. 2).

For normally urging these jaws in closed position with their rear edges in abutment, tension supplying means, such as the springs 23, are preferably employed, having the opposite ends of each spring connected to a different one of the jaws by suitable means such as the threaded shafts 24 passing through apertures in suitable anchors 26 affixed to the jaw and held in position by nuts 25.

For enabling the gun 22 to be freely positioned both up and down in elevation, as well as side to side in azimuth, or at any other desired angle, the slotted mouth 21 may be rotated about the longitudinal or lengthwise axis of the aircraft 27 (see Fig. 2) by rotating the entire turret frame, preferably by supplying a spur gear 28 affixed about the periphery of the frame 10, and meshing this gear with a second spur gear 29 rotated by a suitably driven drive shaft 30. Thus, as shown by Figs. 1, 3, and 4, the turret housing assembly including the frame 10 and jaws 11 and 14 may be rotated about the longitudinal aircraft axis 27 over a full 360 degrees, enabling the slotted opening formed by the jaws to assume any angle about said axis, and thereby enabling the gun 22 to be freely positioned in azimuth or elevation as desired. Consequently, it may be observed from Fig. 2 that the streamlined formation of the turret housing jaws 11 and 14 always remain symmetrically disposed with respect to the longitudinal axis 27 of the craft, irrespective of the position of the gun 22, whereby the wind resistance and drag supplied by this streamlined housing remain substantially constant for any given position of the gun and provide no additional turning torques upon the aircraft as the gun position is varied through any permissible angle in azimuth or elevation.

In accordance with the present invention, the gun itself is directed to its desired position in azimuth and elevation by gun-directing means well known in the art (not shown), and the turret housing rotating mechanism is controlled by movements of the gun rather than being rotated by the gun-positioning mechanism.

More specifically, in accordance with the present invention, the mechanism for rotating the turret housing 9 may be considered as a follower mechanism to the position of the gun, whereby as the gun is directed to assume a desired position in azimuth and elevation, the turret housing is rotated to orient the gun slot 21 in the direction of the hypotenuse of the triangle being formed by the azimuth and elevation displacement of the gun from its centered position.

Referring again to Fig. 1, illustrating the slot opening 21 in substantially horizontal position, and assuming that it is desired to train the gun 22 in elevation in an upward direction; as the gun is positioned upwardly by the gun director, it strikes the forward end of the edge 17 of upper jaw 11; and as it continues upwardly, pivots this jaw about its pivot points 12 and 13. As the upper jaw 11 opens or pivots as urged by the upward force of gun 22, a stop member 32 that may be centrally disposed about the rear portion of the jaw 11 moves upwardly and eventually strikes a button 33 of an electric switch 34 fastened by arms 35 and 36 to the housing frame 10, thereby electrically closing the contacts 37 and 38 of the switch.

Referring to electrical schematic Fig. 5, it is noted that as switch contacts 37 and 38 are closed by the actuation of button 33, an electrical circuit is completed from a ground connection to contact 37 and through the closed switch contacts 37 and 38 and over line 39 through contact 40 of snap-action switch 50 and upwardly over line 41 to energize the winding 42 of a relay energized from source line 43. Energized coil 42 thereupon closes relay contactors 44 and 45, energizing an electrical motor 31, as may be seen by tracing the electrical wiring through contactors 44 and 45. Energized motor 31 thereafter positions the drive shaft 30 and spur gear 29 to rotate the turret housing frame 10 in a clockwise direction; and jaw members 11 and 14 being driven by the frame 10, are accordingly rotated in a clockwise direction. As this housing rotates, the angular position of its slot 21 is varied until assuming a vertical position. When reaching this vertical position, the upward force exerted by gun 22 against jaw 11 is released and the jaw 11 closes as urged by springs 23 to its abutted position against jaw 14 whereupon the stop member affixed thereto becomes disengaged from pushbutton 33 of switch 34, opening the electrical contacts 37 and 38, and de-energizing relay 42 and motor 31. It is to be noted that jaw 11 returns to its normally abutted position against jaw 14 only after it has been relieved of the pressure being exerted against it by the gun 22, and this occurs only after the slot 21 has been positioned to enable the gun to be trained in its desired elevation position (as initially assumed in the example given).

On the other hand, assuming it is desired to train the gun 22 in elevation in a downward direction from the position shown in Fig. 1, gun 22 strikes the edge 18 of the lower jaw 14 pivoting or opening this jaw about its pivots 15 and 16. In this instance a similar limit switch 48 (Fig. 5) is operated closing contacts 46 and 47 in a manner similar to switch 34. Closing contacts 46 and 47, in this instance, energizes a lower relay 54 through contact 51 of snap-action switch 50 to close contactors 55 and 56 thereby energizing driving motor 31 in the opposite direction to rotate the turret frame 10 in a counterclockwise direction. Again this turret is rotated until the turret slot 21 is in a vertical position enabling free movement of the gun 22 to its desired trained position.

Thus, by means of the limit switching means 34 and 48, operated in response to opening of either the upper or lower jaws 11 and 14 of the housing, as determined by the force exerted against them by the barrel of gun 22, the housing is rotated in the proper direction to correctly position the slot opening 21 until the gun 22 may be freely directed to its desired position.

In a similar manner, the gun slot opening 21 may be positioned at any other angle intermediate horizontal and vertical positions enabling the gun 22 to be trained at over a range of substantially 180 degrees in both elevation and azimuth.

However, it is also desired that the housing be rotated through the shortest possible angle to enable the gun slot 21 to assume the correct desired position, rather than, for example, turning through an angle of 350 degrees in one direction when only a 10-degree angular rotation in the opposite direction would suffice. For determining the proper direction the housing should be rotated for positioning the gun slot 21 to its desired position through this smallest angle and in the shortest possible time, the reversing switch 50 is provided, as best shown in Figs. 1 and 5. This reversing switch 50 is actuated by a substantially butterfly shaped member 53 that engages the barrel of gun 22 and by following the movements of the gun rotates the switch shaft 53a either clockwise or counterclockwise as the gun is positioned from its central position. Switch shaft 53a, in turn, actuates the movable contactors of switch 50 to close either the lower two contacts 40 and 51 (Fig. 5) or the upper two contacts 51 and 52 depending upon its direction of rotation.

Considering the operation of the reversing switch 50 and referring to Fig. 3 wherein the gun slot 21 is in vertical position; and assuming it is desired that the gun 22 be trained to its northeast quadrant (to the right and above its central position), it is obvious that the quickest manner of positioning the slot 21 to the desired angle is to rotate the housing clockwise as indicated by the arrow. This is accomplished by means of the reversing switch 50 which is directed by the upward position of the gun 22, that rotates butterfly member 53 counterclockwise, to close contacts 40 and 51 of switch 50. Closing these contacts 40 and 51 determines that the turret will be rotated clockwise if the gun moves to the right and counterclockwise if the gun moves to the left. For example, as the gun 22 is directed to the right, jaw 11 is urged to its open position actuating button 33 of limit switch 34 to close contacts 37 and 38. Closing contacts 37 and 38 completes the electrical circuit energizing relay 42 through lines 39 and 41 thereby energizing motor 31 to rotate the housing in the clockwise direction as desired. Conversely, if the gun had been directed to the left in Fig. 3, from its position shown, limit switch contacts 46 and 47 would have been closed completing the circuit to energize lower relay 54 and thereby energizing motor 31 to rotate the turret in the counterclockwise direction. Thus, it is observed by this example that the housing and gun slot 21 are not only rotatably oriented to enable the gun to be directed to any desired position in elevation and azimuth, but the housing is rotated in the proper direction and through the smallest angle to reach this position by means of reversing switch 50.

Another example of the operation of reversing switch 50 is shown in Fig. 4 where the gun 22 is shown in the lower portion of slot 21. In this position the gun 22 has rotated butterfly member 53 in a clockwise direction thereby closing contacts 51 and 52 of switch 50. If gun 22 is now moved to the left, jaw member 14 is urged to its open position which actuates limit switch 48 to close contacts 46 and 47. Closing contacts 46 and 47 energizes upper relay 42, through contact 52 of switch 50, thereby energizing motor 31 to rotate the housing in a clockwise direction. Conversely, if the gun 22 is directed to the right in Fig. 4 contacts 37 and 38 of limit switch 34 would be closed. This would energize lower relay 54 through contact 51 of switch 50 thereby energizing motor 31 to rotate the housing in a counterclockwise direction.

Thus, it is observed that the overall housing mechanism operates independently of the automatic mechanism (not shown) for directing the gun 22 in azimuth and elevation but, instead, responds to the deflection of the gun from its streamlined position to so adjust itself as to enable the positioning of its slot 21 along the hypotenuse of the desired azimuth and elevation angles, so as to allow free, unhindered movement of the gun. Additionally, it is observed that the follower mechanism interconnecting the gun and housing determines not only the desired slot position, but also determines how best to rotate the housing to enable this slot to reach the desired orientation within the shortest possible rotation of the housing.

Although the turret housing has been shown and described as comprising a circular frame 10 having jaws 11 and 14 of a given streamlined configuration and being driven by gearing means, it is obvious that many changes in this configuration may be made, using a frame that is other than circular as well as jaws having different shapes and sizes. Belt drives and other known drives may similarly replace the gearing shown to rotate the housing. Moreover, it is obvious to those skilled in the art that although on-off type limit switches and reversing switches are employed, continuous electrical sensing elements of many types such as magnetic or optical sensing means may also be employed. Since these and many other changes may be readily made by those skilled in this art without departing from the true spirit or scope of the invention herein disclosed, this invention is to be considered limited only by the following claims appended hereto.

What we claim as new and desire to secure by Letters Patent of the United States is:

1. A gun turret housing for aircraft comprising an arcuate endless frame, two streamlined jaw members pivotally supported in confronting relation by said frame, said jaws being provided with cutaway portions forming an elongate slotted opening therebetween enabling the projections of a gun therethrough, means for rotating said frame to position said slot opening, and switching means selectively responsive to the opening of either jaw about its pivotal support for energizing said rotating means in opposite directions.

2. A gun turret housing for aircraft comprising an arcuate endless frame, two streamlined jaw members pivotally supported in confronting relation by said frame, said jaws beings provided with cutaway portions forming an elongate slotted opening therebetween enabling the projections of a gun therethrough, means for rotating said frame to position said slot opening, switching means selectively responsive to the opening of either jaw about its pivotal support for energizing said rotating means in opposite directions, and means responsive to the movement of said gun from a central position within said slot for reversing the energization of said rotating means in response to said selective switching means.

3. In a gun turret housing for aircraft, an endless frame, two elongate semicone-shaped jaw members pivotally supported in confronting relation by said frame, said jaws being provided with cutaway portions forming an elongate opening therebetween enabling the projection of a gun therethrough, means for rotating said frame to position said opening, and switching means selectively responsive to the opening of either jaw about its pivotal support for energizing said rotating means in opposite directions.

4. In a gun turret housing for aircraft, an endless frame, two elongate semicone-shaped jaw members pivotally supported in confronting relation by said frame, said jaws being provided with cutaway portions forming an elongate opening therebetween enabling the projection of a gun therethrough, means for rotating said frame to position said opening, switching means selectively responsive to the opening of either jaw about its pivotal support for energizing said rotating means in opposite directions, and means responsive to the movement of said gun from a central position within said slot for reversing the energization of said rotating means in response to said selective switching means.

5. In a streamlined housing for enclosing a member rotatable about two perpendicular axes, said housing having an elongate opening for enabling limited movement of said member within said opening, means responsive to movement of said member for positioning said housing and elongate opening to permit greater movement of said member about both axes, said means including a means selectively responsive to the movement of said member in a given direction for positioning said housing to vary the position of said opening and thereby enabling continued movement of said member in the given direction.

6. In a streamlined housing for enclosing a member rotatable about two perpendicular axes, said housing having an elongate opening for enabling limited movement of said member within said opening, means responsive to movement of said member for positioning said housing and elongate opening to permit greater movement of said member about both axes, said means including a means selectively responsive to the movement of said member in a given direction for positioning said housing to vary the position of said opening and thereby enabling continued movement of said member in the given direction, and means responsive to movement of said member from a given position for controlling the position of said housing to reach the desired position with a minimum of movement.

7. In a streamlined housing for enclosing a member rotatable about two perpendicular axes, said housing having an elongate slotted opening for enabling reciprocal movement of said member therein, means responsive to movement of said member for rotating said housing and slotted opening to permit greater movement of said member about both axes, said means including a means responsive to the movement of said member in a direction having a component transverse to said slot for rotating said housing to position said slotted opening in the direction of member movement.

8. In a streamlined housing for enclosing a member rotatable about two perpendicular axes, said housing having an elongate slotted opening for enabling reciprocal movement of said member therein, means responsive to movement of said member for rotating said housing and slotted opening to permit greater movement of said member about both axes, said means including a means responsive to the movement of said member in a direction having a component transverse to said slot for rotating said housing to position said slotted opening in the direction of member movement, and including means responsive to the relative orientation of said slotted opening referenced to the direction of movement of said member to reversibly rotate said housing through the smallest angle to assume said desired position.

9. In an enclosure for housing a gun in the tail portion of an aircraft, said enclosure having a slotted opening substantially transverse to the craft longitudinal axis for enabling the positioning of a gun therethrough, and being formed with a streamlined outer configuration for diminishing wind resistance; means for rotating the enclosure about said longitudinal axis to vary the orientation of said slotted opening, said means including motor means for rotatably driving said enclosure in reverse directions, and switching means responsive to movement of the gun in a direction having a component transverse to said opening for energizing said motor means to rotate the housing and orient the slotted opening in the direction of movement of said gun.

10. In an enclosure for housing a gun in the tail portion of an aircraft, said enclosure having a slotted opening substantially transverse to the craft longitudinal axis for enabling the positioning of a gun therethrough, and being formed with a streamlined outer configuration for diminishing wind resistance; means for rotating the enclosure about said longitudinal axis to vary the orientation of said slotted opening, said means including motor means for rotatably driving said enclosure in reverse directions, switching means responsive to movement of the gun in a direction having a component transverse to said opening for energizing said motor means to orient the slotted opening in the direction of movement of said gun, and means responsive to movement of said gun in a direction having a component along said slotted opening for reversibly connecting said switch means to said motor means.

11. In a streamlined enclosure for housing a gun in the tail portion of an aircraft, said enclosure having a slotted opening for enabling movement of the gun therethrough, means for rotating said enclosure about the longitudinal axis of the aircraft for positioning said slotted opening, and means responsive to the direction of movement of the gun transverse to said slotted opening for reversibly energizing said rotating means to orient said slot in the desired direction of gun movement through the shortest angular rotation.

12. In a streamlined enclosure for housing a gun in the tail portion of an aircraft, said enclosure having a slotted opening for enabling movement of the gun therethrough, means for rotating said enclosure about the longitudinal axis of the aircraft for positioning said slotted opening, means responsive to the direction of movement of the gun transverse to said slotted opening for reversibly energizing said rotating means to orient said slot in the desired direction of gun movement, and means responsive to the direction of movement of the gun along the slotted opening for reversibly controlling the direction of said rotating means.

References Cited in the file of this patent

UNITED STATES PATENTS

| | | |
|---|---|---|
| 2,382,016 | Love | Aug. 14, 1945 |
| 2,454,806 | Kemmer et al. | Nov. 30, 1948 |

FOREIGN PATENTS

| | | |
|---|---|---|
| 504,816 | France | Apr. 23, 1920 |